(12) United States Patent
Xu et al.

(10) Patent No.: US 12,101,407 B1
(45) Date of Patent: Sep. 24, 2024

(54) AUTOMATED POOL CONFIGURATION PROVISIONING

(71) Applicant: Auradine, Inc., Santa Clara, CA (US)

(72) Inventors: Patrick Xu, Saratoga, CA (US); Liang Li, Cupertino, CA (US); Aditya Batra, Saratoga, CA (US); Sridhar Chirravuri, Sunnyvale, CA (US); Lei Chang, Saratoga, CA (US); Robert Ashley, Santa Clara, CA (US)

(73) Assignee: Auradine, Inc., Santa Clara, CA (US)

( * ) Notice: Subject to any disclaimer, the term of this patent is extended or adjusted under 35 U.S.C. 154(b) by 0 days.

(21) Appl. No.: 18/508,881

(22) Filed: Nov. 14, 2023

Related U.S. Application Data

(60) Provisional application No. 63/529,290, filed on Jul. 27, 2023, provisional application No. 63/521,068, filed on Jun. 14, 2023.

(51) Int. Cl.
*H04L 12/24* (2006.01)
*H04L 9/32* (2006.01)

(52) U.S. Cl.
CPC .................. *H04L 9/3213* (2013.01)

(58) Field of Classification Search
CPC ...................................... H04L 9/3213
USPC ...................................... 713/159
See application file for complete search history.

(56) References Cited

U.S. PATENT DOCUMENTS

| | | | |
|---|---|---|---|
| 7,315,887 B1 | 1/2008 | Liang et al. | |
| 2019/0213046 A1* | 7/2019 | Matus | G06F 9/5044 |
| 2022/0086001 A1* | 3/2022 | Rahn | H04L 9/3234 |
| 2022/0253795 A1 | 8/2022 | Gersbach et al. | |
| 2023/0362128 A1* | 11/2023 | Eastlake, III | H04L 9/3239 |

FOREIGN PATENT DOCUMENTS

WO  WO 2015131524  9/2015

OTHER PUBLICATIONS

International Search Report and Written Opinion in International Appln. No. PCT/US2024/034086, mailed on Jul. 26, 2024, 9 pages.

* cited by examiner

*Primary Examiner* — Jeffrey C Pwu
*Assistant Examiner* — Nega Woldemariam
(74) *Attorney, Agent, or Firm* — Fish & Richardson P.C.

(57) ABSTRACT

An asset management method is provided. The asset management method includes establishing a network connection between a cryptomining asset and an asset management server. The asset management method includes generating a digital token, wherein the digital token includes an identifier assigned to the cryptomining asset by a cryptomining asset provider. The asset management method includes transmitting, to the asset management server and via the network connection, the digital token. The asset management method includes receiving, from the asset management server, a message corresponding to the identifier, wherein the message includes a configuration of a cryptomining task. The asset management method includes loading the configuration in the cryptomining asset. Another asset management method and a cryptomining asset are also provided.

16 Claims, 6 Drawing Sheets

| Asset ID | Pool | Token | Configuration | | |
|---|---|---|---|---|---|
| | | | Server URL | Username | Password |
| 1 | BTC1 | | | | |
| 2 | BTC1 | | | | |
| 3 | ETH1 | | | | |
| 4 | ETH2 | | | | |
| 5 | BTC2 | | | | |
| 6 | BTC1 | *** | *** | *** | *** |

FIG. 3

AUTOMATED POOL CONFIGURATION PROVISIONING

CROSS-REFERENCE TO RELATED APPLICATIONS

This application claims priority to U.S. Provisional Patent Applications No. 63/521,068, filed on Jun. 14, 2023, and No. 63/529,290, filed on Jul. 27, 2023, the contents of which are incorporated herein by reference.

TECHNICAL FIELD

This disclosure relates generally to computer systems for cryptomining asset management.

BACKGROUND

A large number of cryptomining assets (e.g., computers that perform computation tasks for mining cryptocurrencies) may be utilized to perform complex cryptomining tasks. After an asset is connected to a network and before the asset performs a cryptomining task, the asset may need to be configured with, e.g., network-specific or task-specific settings.

SUMMARY

This disclosure relates to cryptomining asset management. One or more implementations of the disclosure make improvements to the onboarding process by automating the provisioning of asset configurations used in performing the cryptomining tasks.

In a general aspect, an asset management method is provided. The asset management method includes establishing a network connection between a cryptomining asset and an asset management server. The asset management method includes generating a digital token, wherein the digital token includes an identifier assigned to the cryptomining asset by a cryptomining asset provider. The asset management method includes transmitting, to the asset management server and via the network connection, the digital token. The asset management method includes receiving, from the asset management server, a message corresponding to the identifier, wherein the message includes a configuration of a cryptomining task. The asset management method includes loading the configuration in the cryptomining asset.

In some implementations, the configuration is a first configuration. The asset management method further includes overriding the first configuration using a second configuration locally saved on the cryptomining asset.

In some implementations, the configuration includes a link to a pool server that manages the cryptomining task; and credentials for accessing the pool server.

In some implementations, the network connection is a first connection. The asset management method further includes: establishing a second network connection between the cryptomining asset and the pool server according to the link; providing the credentials to the pool server via the second network connection; and performing the cryptomining task under the management of the pool server.

In some implementations, the asset management method further includes receiving, from the asset management server, an updated configuration corresponding to the pool server.

In some implementations, establishing the network connection includes: obtaining a network address from a network adaptor using a Dynamic Host Configuration Protocol (DHCP); transmitting an onboarding message to the asset management server, wherein the onboarding message includes the network address; and receiving an onboarding acknowledgement message from the asset management server.

In some implementations, the network connection is based on a protocol of at least one of: Hypertext Transfer Protocol Secure (HTTPS), or WebSocket.

In some implementations, the digital token includes a public key of an encrypted JavaScript Object Notation (JSON) Web Token (JWT).

In some implementations, the asset management method further includes validating the configuration.

In another general aspect, an asset management method is provided. The asset management method includes establishing a network connection between a cryptomining asset and an asset management server. The asset management method includes receiving, from the cryptomining asset and via the network connection, a digital token including an identifier of the cryptomining asset. The asset management method includes obtaining, based on the identifier, a configuration of a cryptomining task to be performed by the cryptomining asset. The asset management method includes transmitting, to the cryptomining asset, a message including the configuration.

In some implementations, establishing a network connection includes: detecting, using a network adaptor, that the cryptomining asset is connected to a network; and obtaining, from the network adaptor, a network address of the cryptomining asset assigned using a DHCP.

In some implementations, establishing a network connection includes: receiving an onboarding message from the cryptomining asset, wherein the onboarding message includes a network address of the cryptomining asset assigned using a DHCP; and transmitting an onboarding acknowledgement message to the cryptomining asset.

In some implementations, the configuration includes: a link to a pool server that manages the cryptomining task; and credentials for accessing the pool server.

In some implementations, the configuration causes the cryptomining asset to perform the cryptomining task under the management of the pool server.

In some implementations, the asset management method further includes registering the cryptomining asset into a registry stored on the asset management server. The registry corresponds to a pool server that manages the cryptomining task.

In some implementations, the asset management method further includes transmitting, to one or more assets identified in the registry, an updated configuration.

In some implementations, the asset management method further includes decrypting the encrypted JWT to obtain the identifier of the cryptomining asset.

In another general aspect, a cryptomining asset is provided. The cryptomining asset includes one or more processors coupled to a memory. The one or more processors are configured to execute instructions stored in the memory to cause the cryptomining asset to perform operations. The operations include establishing a network connection between a cryptomining asset and an asset management server. The operations include generating a digital token, wherein the digital token includes an identifier assigned to the cryptomining asset by a cryptomining asset provider. The operations include transmitting, to the asset management server and via the network connection, the digital token. The operations include receiving, from the asset management server, a message corresponding to the identifier, wherein the message includes a configuration of a cryptomining task; and loading the configuration in the cryptomining asset.

The details of one or more disclosed implementations are set forth in the accompanying drawings and the description below. Other features, aspects, and advantages will become apparent from the description, the drawings and the claims.

BRIEF DESCRIPTION OF THE FIGURES

FIG. 3 illustrates an example cryptomining asset registry maintained by an asset management server, according to some implementations.

DETAILED DESCRIPTION

Cryptomining tasks often involve a large number of cryptomining assets to collaboratively resolve one or more complex computing problems. Cryptomining assets working on the same computing problems are sometimes organized as a pool, managed by a pool server. The pool server can, e.g., authenticate the credentials of new assets of the pool, allocate pool resources, such as network bandwidth, to assets belong to the pool, and reward individual assets based on their contribution to the task. To effectively and efficiently perform a cryptomining task as part of a pool, an asset loads various configurations that are often pool-specific. Example configurations include network address of the pool server, username and password for accessing pool resources, level and type of computing power contributed by an asset to the pool, and goal of the cryptomining task (e.g., mining for BITCOINs [BTCs] or ETHERs [ETHs]).

When a user (e.g., cryptominer) obtains a new cryptomining asset, the user may need to set up the cryptomining asset with configurations before the asset can join a pool and perform a cryptomining task. The set-up of an asset, also known as on-boarding or registration, takes considerable amount of time and effort, which can be burdensome especially when the user has a large number of assets to set up. Accordingly, it is desirable to have a mechanism to automate the on-boarding process to save human effort.

One or more implementations of the disclosure make improvements to the onboarding process with high level of automation. As described below, some implementations allow an asset to automatically establish a network connection with an asset management server, which can automatically transmit ("provision") asset configurations pre-stored on the server. The implementations also allow the asset, upon receiving the configurations from the asset management server, to either automatically load the configurations or override the configurations with locally stored (e.g., on a memory of the asset) configurations, and use the configurations to automatically connect to the pool server and perform the cryptomining task. The onboarding process requires very limited human involvement and thus can significantly improve efficiency and reduce cost.

Figure 1:
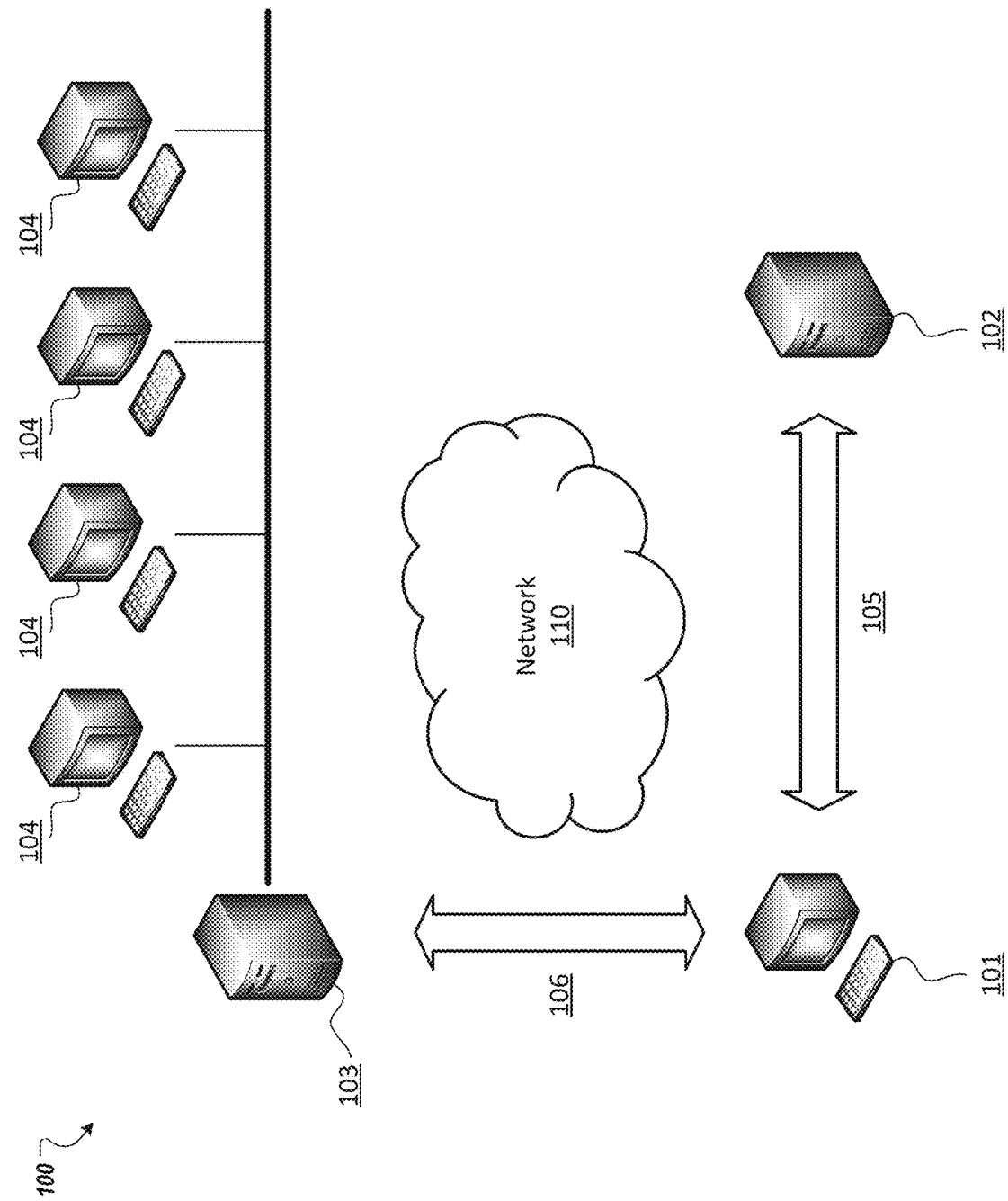
FIG. 1 illustrates an example cryptomining asset management system, according to some implementations.

FIG. 1 illustrates an example cryptomining asset management system 100, according to some implementations. The cryptomining asset management system 100 includes cryptomining asset 101, asset management server 102, and pool server 103, which manages a pool of cryptomining assets 104 that are configured to perform a cryptomining task. These components are communicatively connected by network 110, which can be a public network, such as Internet, or a private network, or a combination of both.

During onboarding, cryptomining asset 101 can establish first network connection 105 with asset management server 102. Via network connection 105, cryptomining asset 101 can obtain pool configurations from asset management server 102. Using the pool configurations, cryptomining asset 101 can establish second network connection 106 with pool server 103 to access pool resources managed by pool server 103 and perform the cryptomining task. With one or more features describe below, these processes can be automated with very little human involvement.

Figure 2:
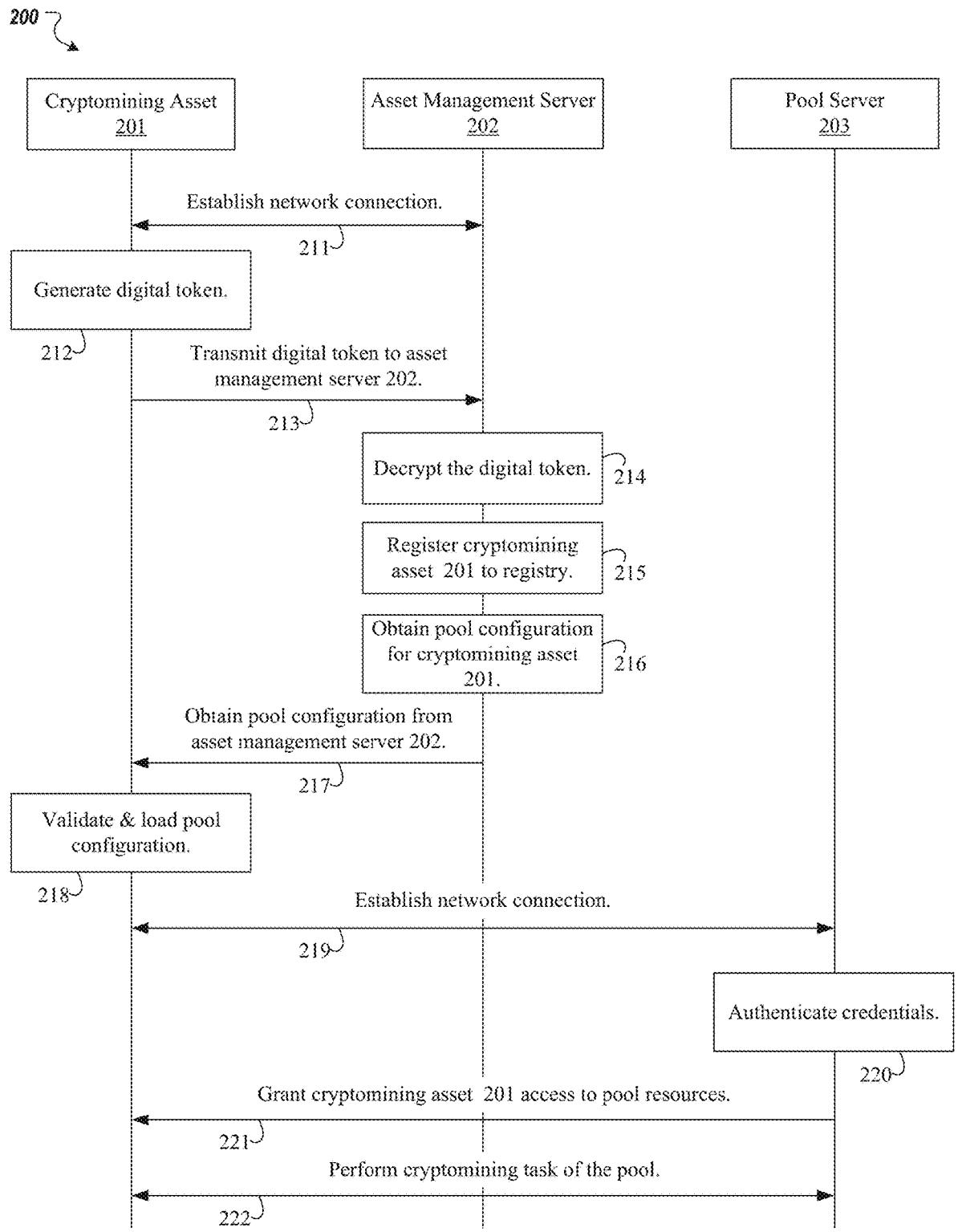
FIG. 2 illustrates an example onboarding procedure, according to some implementations.

FIG. 2 illustrates an example onboarding procedure 200, according to some implementations. Onboarding procedure 200 involves cryptomining asset 201, asset management server 202, and pool server 203, which can be similar to cryptomining asset 101, asset management server 102, and pool server 103, of FIG. 1, respectively.

At 211, cryptomining asset 201 and asset management server 202 establish a network connection ("first network connection"), which can be similar to first network connection 105 of FIG. 1. The first network connection established at 211 can be compliant with secured protocols such as Hypertext Transfer Protocol Secure (HTTPS) or WebSocket.

The establishment of first network connection between cryptomining asset 201 and asset management server 202 can involve a network adaptor, which can be a component of asset management server 202 or a separate network server. In some implementations, after cryptomining asset 201 is connected to a network, cryptomining asset 201 is assigned, by the network adaptor, a network address using a Dynamic Host Configuration Protocol (DHCP) that uniquely identifies the position of cryptomining asset 201 in the network. The network adapter can inform asset management server 202 of the network address assigned to cryptomining asset 201 so that asset management server 202 is aware of a new asset being connected to the network. Alternatively or additionally, upon being connected to the network and receiving the network address, cryptomining asset 201 obtains, from the network adapter, the network address of asset management server 202. Using the network address of asset management server 202, cryptomining asset 201 can transmit an onboarding message to asset management server 202. In the onboarding message, cryptomining asset 201 can include its own network address received from the network adapter. This way, asset management server 202 can become aware of newly-connected cryptomining asset 201 and transmit an onboarding acknowledgement message to cryptomining asset 201.

At 212, cryptomining asset 201 generates a digital token. The digital token can be, e.g., a software object that includes a unique identifier of cryptomining asset 201. In some implementations, the unique identifier (ID) includes a serial ID assigned by a provider (e.g., manufacturer or distributor) of cryptomining asset 201 and programmed to cryptomining asset 201 (e.g., stored in a memory accessible by cryptomining asset 201) by the provider at the time of manufacturing or delivering cryptomining asset 201.

Cryptomining asset 201 can generate the digital token based on, e.g., a JavaScript Object Notation (JSON) Web Token (JWT) that is programmed to cryptomining asset 201 by the provider. For example, cryptomining asset 201 can access a public key of a programmed JWT and encapsulate the public key along with the unique identifier in a digital token. Similar to the unique identifier, the JWT and its public key can be unique to cryptomining asset 201. In some implementations, cryptomining asset 201 encrypts the digital token to improve data security.

At 213, cryptomining asset 201 transmits the digital token to asset management server 202. The transmission can be via the first network connection established at 211. Along with the digital token, cryptomining asset 201 can expressly request asset management server 202 to provide configurations to the address of cryptomining asset 201. Alternatively or additionally, asset management server 202 can automatically (e.g., without being expressly requested) send the pool configurations to cryptomining asset 201.

In some implementations, the establishment of first network connection at 211 takes place during or after the generation and transmission of the digital token at 212 and 213. For example, the network address of asset management server 202 can be programmed to cryptomining asset 201 before cryptomining asset 201 is connected to a network. Upon connection to the network, cryptomining asset 201 can automatically start a process to request establishing the first network connection with asset management server 202 according to the programmed network address. As part of the process, cryptomining asset 201 can generate the digital token and provide the digital token to asset management server 202 to trigger a registration method programmed on asset management server 202. By executing the registration method, asset management server 202 completes the establishment of the first network connection and proceeds with the remaining operations of onboarding procedure 200.

At 214, asset management server 202 decrypts the digital token to extract the encapsulated information, such as the public key and the unique ID of cryptomining asset 201. In some implementations, asset management server 202 further verifies the validity and authentication of the extracted information. For example, when the provider of cryptomining asset 201 programs the public key, the provider also records the unique ID and/or the public key in the memory of asset management server 202, which can be operated by the same provider. As such, upon receipt of the digital token, asset management server 202 can compare the public key and unique ID extracted from the digital token with those stored in the memory of asset management server 202 to verify the format, content, and/or source of the information received from cryptomining asset 201 match those on the record. For example, asset management server 202 can verify, based on the unique ID in the digital token, that the user of cryptomining asset 201 has authorization (e.g., by subscription or purchase) to use the service of the provider.

At 215, upon validating and authenticating the information included in the digital token, asset management server 202 registers cryptomining asset 201 to a registry managed by asset management server 202. The registry can include a list of cryptomining assets that have established network connections with asset management server 202 and are authorized to use the service of the provider. An example registry is described later with reference to FIG. 3. For each given cryptomining asset registered in the registry, asset management server 202 can generate a digital token based on the information, such as the public key and the unique ID, of that given cryptomining asset. As such, the digital token generated by asset management server 202 serves as a counterpart to the digital token received from the given cryptomining asset, and can be used by asset management server 202 in communications with the given cryptomining asset.

At 216, asset management server 202 obtains pool configuration for cryptomining asset 201, e.g., from a memory of asset management server 202 or from a remote server. For example, when a user purchases cryptomining asset 201, the user can be prompted to define and upload, via an online portal of the provider, their desired cryptomining task, desired level of computing capacity, or other settings that are customized for the user. Asset management server 202 can record these user-specific settings in its memory as a configuration file corresponding to cryptomining asset 201. When the user connects cryptomining asset 201 to network, asset management server 202 can search its memory to retrieve the configuration file corresponding cryptomining asset 201. The user can further add, delete, or modify the user-specific settings corresponding to cryptomining asset 201 via the online portal. In the event the user does not create its own configuration file and store that file in asset management server 202, the provider of cryptomining asset 201 can provide a default configuration file, stored in asset management server 202, that can be provided to and loaded by cryptomining asset 201.

The configuration file can include multiple pieces of information. For example, the configuration file can specify a network link, such as a Uniform Resource Locator (URL), of a pool server, that the user is authorized to access. The pool server can be assigned by asset management server 202 based on the user's purchase or subscription, or can be specified by the user based on its preference. The configuration file can further provide access credentials to the pool server, such as a username and a password, that the user obtained in advance based an authorization obtained from an operator of the pool server.

At 217, cryptomining asset 201 obtains, e.g., fetches, the pool configuration from asset management server 202. The fetch can be via the first network connection established at 211. In addition, the fetch of pool configuration can be accompanied by the digital token generated by asset management server 202, which corresponds to the public key of the JWT programmed in cryptomining asset 201.

At 218, cryptomining asset 201 validates the pool configuration received from asset management server 202. The validation can be based on, e.g., the digital token generated and provided by asset management server 202. The validation can include, e.g., determining whether the pool configurations are intended for the right asset and right pool, whether the pool configurations are properly formatted and/or encrypted, and whether the pool configurations are up-to-date. If cryptomining asset 201 determines that the received pool configuration is invalid, then cryptomining asset 201 can discard the pool configuration and request asset management server 202 to transmit an updated pool configuration. Upon determining that the received procuration is valid, cryptomining asset 201 loads the pool configuration into its memory.

In some implementations, the user can provide a local pool configuration that is different from the pool configuration received from asset management server 202. For example, the user can access (e.g., via a software user interface on cryptomining asset 201) the memory of cryptomining asset 201 to store the local configuration in the memory. When cryptomining asset 201 detects the existence of a local pool configuration in its memory, the local pool configuration can override the pool configuration received from asset management server 202. In other words, cryptomining asset 201 can load the local pool configuration, instead of the pool configuration received from asset management server 202, in the event of conflicts between the two pool configurations.

With a pool configuration loaded, a processor of cryptomining asset 201 can access the pool configuration and use the information specified in the pool configuration to access pool server 203. For example, at 219, cryptomining asset 201 can establish a network connection ("second network connection") with pool server 203 using the URL specified in the pool configuration. In establishing the second network connection, cryptomining asset 201 can indicate the settings specified in the pool configuration. For example, cryptomining asset 201 can include the credentials (e.g., username and password) for accessing pool server 203 in a request to join the pool and access the pool resources.

At 220, pool server 203 authenticates the credentials of cryptomining asset 201 to determine whether cryptomining asset 201 is authorized to join the pool and perform the cryptomining task.

At 221, upon determining that cryptomining asset 201 is authorized to join the pool and perform the cryptomining task, pool server 203 transmits a message, via the second network connection, to grant cryptomining asset 201's request. For example, pool server 203 can assign an ID to cryptomining asset 201 as a member of the pool, designate a network port that cryptomining asset 201 can use to exchange data with pool server 203, and allocate computing power for cryptomining asset 201 to use for performing the cryptomining task. At 222, cryptomining asset 201 performs the cryptomining task under the management of pool server 203 and using the pool resources granted by pool server 203.

In some implementations, asset management server 202 transmits updated pool configuration to cryptomining asset 201 periodically or incidentally. For example, even after cryptomining asset 201 has established the second network connection and started to perform the cryptomining task under the management of pool server 203, asset management server 202 can transmit the updated pool configuration to cryptomining asset 201 when the existing credentials for accessing pool server 203 expire after a predetermined period of time. As another example, asset management server 202 can transmit the updated pool configuration to cryptomining asset 201 when pool server 203 becomes unavailable (e.g., due to loss of power or network connection) and is replaced with a backup pool server with a different URL. Asset management server 202 can transmit the updated pool configuration to cryptomining asset 201 only, to cryptomining asset 201 and other cryptomining assets belonging to the same pool, to cryptomining asset 201 and other cryptomining assets belonging to the same user or same group of users, or to all cryptomining assets listed in its registry. This way, cryptomining asset 201 and other cryptomining assets can be synchronized with the network conditions, which can minimize disruptions to the performance of the cryptomining task.

It is noted that not all operations of onboarding procedure 200 are required in all implementations. For example, in some implementations where the digital token is transmitted unencrypted at 213, the decryption of the digital token at 214 is omitted.

FIG. 3 illustrates an example cryptomining asset registry 300, according to some implementations. Cryptomining asset registry 300 can be maintained by an asset management server, such as asset management server 102 of FIG. 1 or asset management server 202 of FIG. 2.

As shown, cryptomining asset registry 300 has six cryptomining assets, identified as Asset #1 to Asset #6. In the illustrated scenario, Assets #1 to #5 are already registered at the time Asset #6 (in bold) establishes a network connection with the asset management server.

Cryptomining asset registry 300 can indicate, e.g., the pool of a cryptomining asset, the digital token corresponding to the cryptomining asset generated by the asset management server, and the configuration of the cryptomining asset. For example, Assets #1 and #2 are assigned to pool BTC1, which is a pool for mining BITCOINs, whereas Assets #3 and #4 are assigned to pools ETH1 and ETH2, respectively, which are pools for mining ETHERs. When Asset #6 is registered, the asset management server can assign Asset #6 to pool BTC1 while recording the digital token and the configuration (e.g., server URL, username, and password) corresponding to Asset #6.

It is noted that not all columns of cryptomining asset registry 300 are required in all implementations. For example, in some implementations the registry can have only the columns for Asset ID and its corresponding configuration, while in some implementations the registry can have only the columns for Asset ID and the corresponding configuration digital token. In some implementations, cryptomining asset registry 300 can have more columns, such as a computing capacity available to each asset.

Figure 4A:
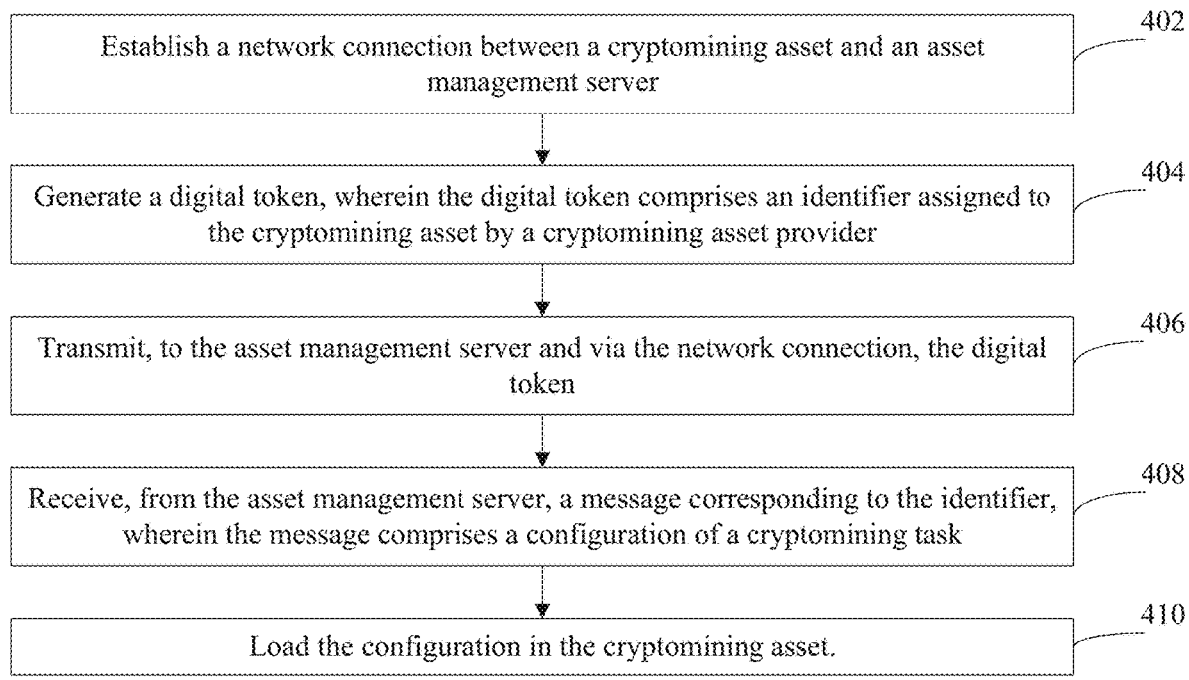
FIGS. 4A and 4B each illustrate an example method for cryptomining asset management, according to some implementations.
Figure 4B:
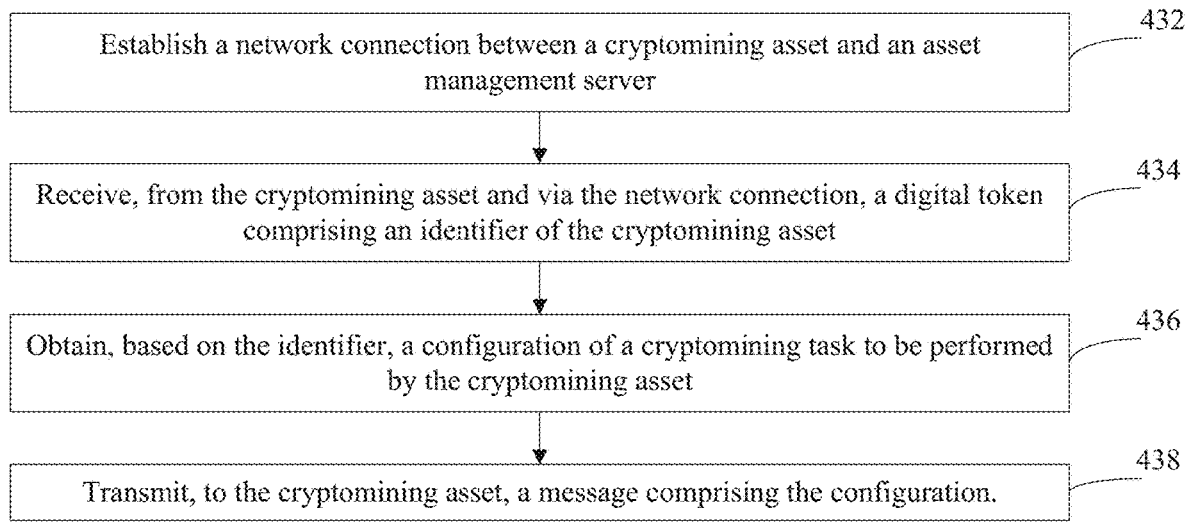

FIGS. 4A and 4B each illustrate an example method, 400A and 400B, respectively, for cryptomining asset management, according to some implementations. It will be understood that each of methods 400A and 400B can be performed, for example, by any suitable system, environment, software, hardware, or a combination of systems, environments, software, and hardware, as appropriate. For example, method 400A can be performed by cryptomining asset 101 of FIG. 1 or cryptomining asset 201 of FIG. 2, and method 400B can be performed by asset management server 102 of FIG. 1 or asset management server 202 of FIG. 2. In some implementations, various steps of each of methods 400A and 400B can be run in parallel, in combination, in loops, or in any order.

At 402 of method 400A, a network connection is established between a cryptomining asset and an asset management server. The network connection can be similar to the first network connection established at 211 of FIG. 2.

At 404, the cryptomining asset generates a digital token, which can be similar to the digital token generated at 212 of FIG. 2. The digital token can include an ID, such as a unique ID assigned to the cryptomining asset by a cryptomining asset provider.

At 406, the cryptomining asset transmits the digital token to the asset management server via the network connection.

At 408, the cryptomining asset receives, from the asset management server, a message corresponding to the ID. The message can include a configuration for the cryptomining asset to perform a cryptomining task. The reception of the message can be similar to the operations at 217 of FIG. 2.

At 410, the cryptomining asset loads the configuration in the cryptomining asset. Similar to the operations at 218 of FIG. 2, the cryptomining asset can use the loaded configuration to connect to a pool server to perform the cryptomining task, or can override the loaded configuration with a local configuration and use the local configuration to connect to the pool server.

At 432 of method 400B, a network connection is established between a cryptomining asset and an asset management server. The network connection can be similar to the first network connection established at 211 of FIG. 2.

At 434, the asset management server receives a digital token from the cryptomining asset via the network connection. The digital token can include an ID, such as a unique ID assigned to the cryptomining asset by a cryptomining asset provider.

At 436, the asset management server obtains, based on the ID, a configuration of a cryptomining task to be performed by the cryptomining asset. For example, the asset management server can obtain the configuration by accessing its memory to look for the configuration defined by the user and uploaded via the online portal.

At 438, the asset management server transmits, to the cryptomining asset, a message including the configuration. The transmission of the message can be similar to the operations at 217 of FIG. 2.

Figure 5:
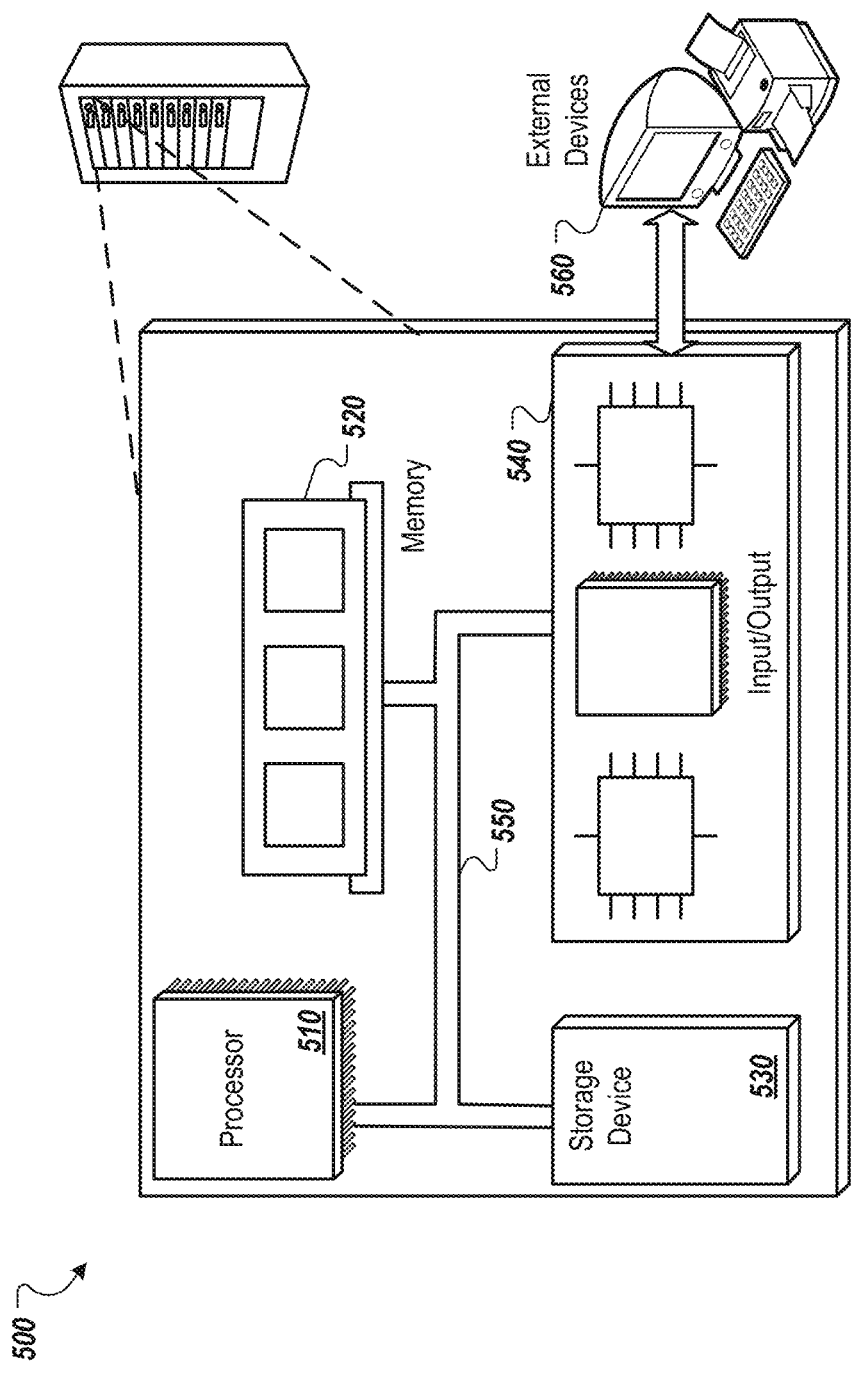
FIG. 5 is a block diagram of an example computer system, according to some implementations.

FIG. 5 is a block diagram of an example computer system 500 according to some implementations. Some components of the system 500 can be implemented as a cryptomining asset (e.g., cryptomining asset 101 or 201), an asset management server (e.g., asset management server 102 or 202), or a pool server (e.g., pool server 103 or 203). The system 500 includes a processor 510, a memory 520, a storage device 530, and one or more input/output interface devices 540. Each of the components 510, 520, 530, and 540 can be interconnected, for example, using a system bus 550.

The processor 510 is capable of processing instructions for execution within the system 500. The term "execution" as used here refers to a technique in which program code causes a processor to carry out one or more processor instructions. In some implementations, the processor 510 is a single-threaded processor. In some implementations, the processor 510 is a multi-threaded processor. The processor 510 is capable of processing instructions stored in the memory 520 or on the storage device 530. The processor 510 may execute operations such as those described with reference to other figures described herein.

The memory 520 stores information within the system 500. In some implementations, the memory 520 is a computer-readable medium. In some implementations, the memory 520 is a volatile memory unit. In some implementations, the memory 520 is a non-volatile memory unit.

The storage device 530 is capable of providing mass storage for the system 500. In some implementations, the storage device 530 is a non-transitory computer-readable medium. In various different implementations, the storage device 530 can include, for example, a hard disk device, an optical disk device, a solid-state drive, a flash drive, magnetic tape, or some other large capacity storage device. In some implementations, the storage device 530 may be a cloud storage device, e.g., a logical storage device including one or more physical storage devices distributed on a network and accessed using a network. In some examples, the storage device may store long-term data. The input/output interface devices 540 provide input/output operations for the system 500. In some implementations, the input/output interface devices 540 can include one or more of a network interface devices, e.g., an Ethernet interface, a serial communication device, e.g., an RS-232 interface, and/or a wireless interface device, e.g., an 802.11 interface, a 3G wireless modem, a 4G wireless modem, a 5G wireless modem, etc. A network interface device allows the system 500 to communicate, for example, transmit and receive data. In some implementations, the input/output device can include driver devices configured to receive input data and send output data to other input/output devices, e.g., keyboard, printer and display devices 560. In some implementations, mobile computing devices, mobile communication devices, and other devices can be used.

A server can be distributively implemented over a network, such as a server farm, or a set of widely distributed servers or can be implemented in a single virtual device that includes multiple distributed devices that operate in coordination with one another. For example, one of the devices can control the other devices, or the devices may operate under a set of coordinated rules or protocols, or the devices may be coordinated in another fashion. The coordinated operation of the multiple distributed devices presents the appearance of operating as a single device.

In some examples, the system 500 is contained within a single integrated circuit package. A system 500 of this kind, in which both a processor 510 and one or more other components are contained within a single integrated circuit package and/or fabricated as a single integrated circuit, is sometimes called a microcontroller. In some implementations, the integrated circuit package includes pins that correspond to input/output ports, e.g., that can be used to communicate signals to and from one or more of the input/output interface devices 540.

Although an example processing system has been described in FIG. 5, implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. In an example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "computing device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as standalone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a GNSS sensor or receiver, or a portable storage device such as a universal serial bus (USB) flash drive.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/-R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

While this specification includes many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

What is claimed is:

1. An asset management method comprising:
   establishing a first network connection between a cryptomining asset and an asset management server;
   generating a digital token, wherein the digital token comprises an identifier assigned to the cryptomining asset by a cryptomining asset provider;
   transmitting, to the asset management server and via the first network connection, the digital token, wherein the digital token includes validation and authentication information that causes the asset management server to register the cryptomining asset to a registry managed by the asset management server;
   receiving, from the asset management server, a message corresponding to the identifier, wherein the message comprises a configuration of a cryptomining task, and wherein the configuration comprises: a link to a pool server that manages the cryptomining task, and credentials for accessing the pool server;
   loading the configuration in the cryptomining asset;
   establishing a second network connection between the cryptomining asset and the pool server according to the link;
   providing the credentials to the pool server via the second network connection; and
   performing the cryptomining task under management of the pool server.

2. The asset management method of claim 1, wherein the configuration is a first configuration, and wherein the asset management method further comprises: overriding the first configuration using a second configuration locally saved on the cryptomining asset.

3. The asset management method of claim 1, further comprising:
   receiving, from the asset management server, an updated configuration corresponding to the pool server.

4. The asset management method of claim 1, wherein establishing the first network connection comprises:
   obtaining a network address from a network adaptor using a Dynamic Host Configuration Protocol (DHCP);
   transmitting an onboarding message to the asset management server, wherein the onboarding message comprises the network address; and
   receiving an onboarding acknowledgement message from the asset management server.

5. The asset management method of claim 1, wherein the first network connection is based on a protocol of at least one of: Hypertext Transfer Protocol Secure (HTTPS), or WebSocket.

6. The asset management method of claim 1, wherein the digital token comprises a public key of an encrypted JavaScript Object Notation (JSON) Web Token (JWT).

7. The asset management method of claim 1, further comprising: validating the configuration.

8. An asset management method comprising:
   establishing a first network connection between a cryptomining asset and an asset management server;
   receiving, from the cryptomining asset and via the first network connection, a digital token comprising an identifier of the cryptomining asset;
   validating and authenticating information included in the digital token;
   in response to the validating and authenticating, registering the cryptomining asset into a registry stored on the asset management server;
   obtaining, based on the identifier, a configuration of a cryptomining task to be performed by the cryptomining asset; and
   transmitting, to the cryptomining asset, a message comprising the configuration,
   wherein the configuration comprises: a link to a pool server that manages the cryptomining task, and credentials for accessing the pool server, and
   wherein the configuration causes the cryptomining asset to: establish a second network connection between the cryptomining asset and the pool server according to the link, provide the credentials to the pool server via the second network connection, and perform the cryptomining task under management of the pool server.

9. The asset management method of claim 8, wherein establishing a network connection comprises:
   detecting, using a network adaptor, that the cryptomining asset is connected to a network; and
   obtaining, from the network adaptor, a network address of the cryptomining asset assigned using a Dynamic Host Configuration Protocol (DHCP).

10. The asset management method of claim 8, wherein establishing a network connection comprises:
    receiving an onboarding message from the cryptomining asset, wherein the onboarding message comprises a network address of the cryptomining asset assigned using a Dynamic Host Configuration Protocol (DHCP); and
    transmitting an onboarding acknowledgement message to the cryptomining asset.

11. The asset management method of claim 8, wherein the registry corresponds to the pool server that manages the cryptomining task.

12. The asset management method of claim 8, further comprising transmitting, to one or more assets identified in the registry, an updated configuration.

13. The asset management method of claim 8, wherein the first network connection is based on a protocol of at least one of: Hypertext Transfer Protocol Secure (HTTPS), or WebSocket.

14. The asset management method of claim 8, wherein the digital token comprises a public key of an encrypted JavaScript Object Notation (JSON) Web Token (JWT).

15. The asset management method of claim 14, further comprising decrypting the encrypted JWT to obtain the identifier of the cryptomining asset.

16. A cryptomining asset comprising one or more processors coupled to a memory, the one or more processors configured to execute instructions stored in the memory to cause the cryptomining asset to perform operations comprising:
- establishing a first network connection between the cryptomining asset and an asset management server;
- generating a digital token, wherein the digital token comprises an identifier assigned to the cryptomining asset by a cryptomining asset provider;
- transmitting, to the asset management server and via the first network connection, the digital token, wherein the digital token includes validation and authentication information that causes the asset management server to register the cryptomining asset to a registry managed by the asset management server;
- receiving, from the asset management server, a message corresponding to the identifier, wherein the message comprises a configuration of a cryptomining task, and wherein the configuration comprises: a link to a pool server that manages the cryptomining task; and credentials for accessing the pool server;
- loading the configuration in the cryptomining asset;
- establishing a second network connection between the cryptomining asset and the pool server according to the link;
- providing the credentials to the pool server via the second network connection; and
- performing the cryptomining task under management of the pool server.

\* \* \* \* \*